UNITED STATES PATENT OFFICE.

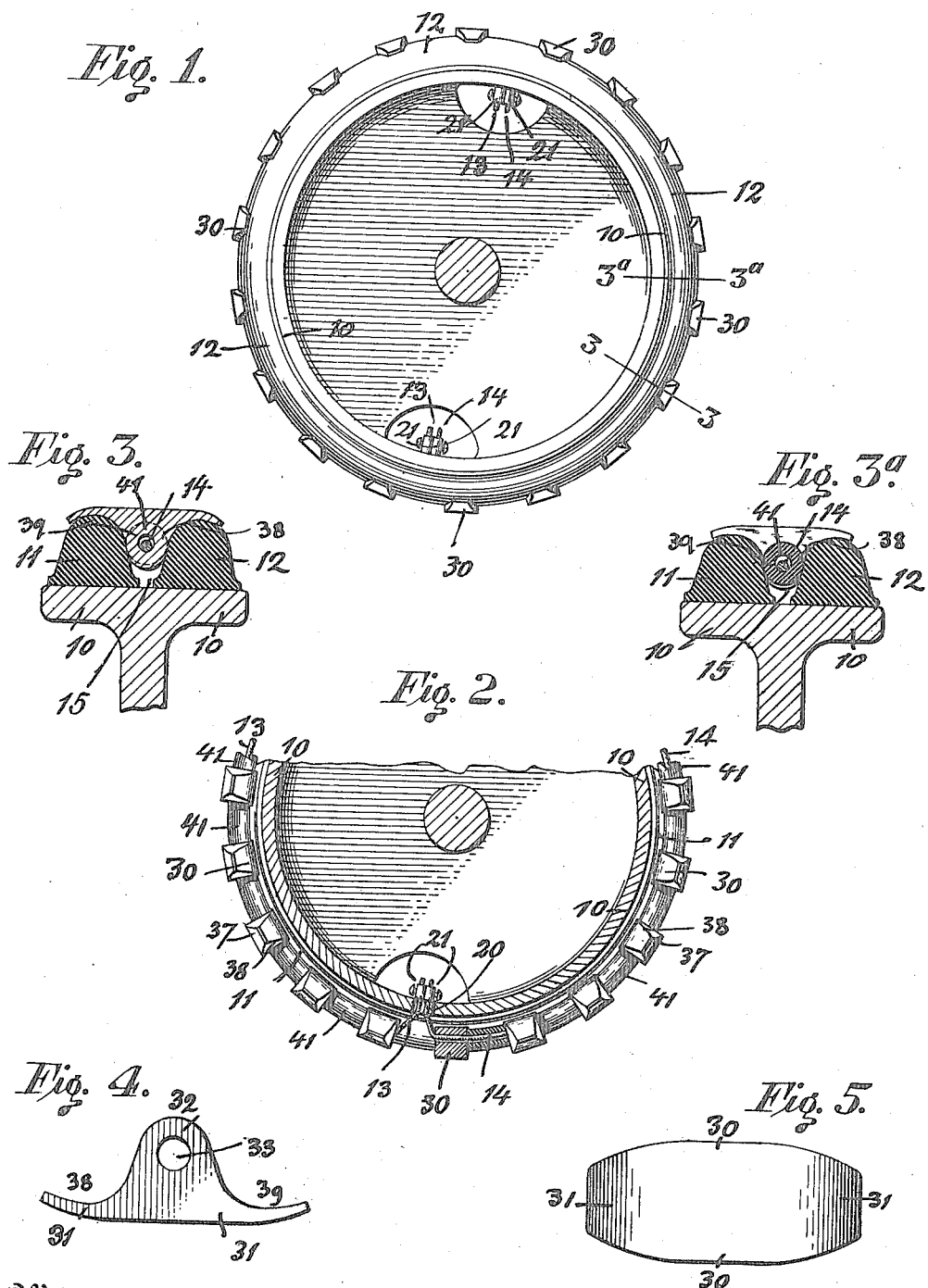

OTTO BAHLS, OF NEW YORK, N. Y.

TIRE-GRIP.

1,145,876. Specification of Letters Patent. Patented July 13, 1915.

Application filed January 28, 1913. Serial No. 744,649.

*To all whom it may concern:*

Be it known that I, OTTO BAHLS, a citizen of the United States, residing in New York, borough of Manhattan, in the State of New York, have invented certain new and useful Improvements in Tire-Grips, of which the following is a specification.

The object of the present invention is to provide a grip for the tires of automobile and other road vehicles which is simple and inexpensive in construction, is easily applied to and removed from the tire, is capable of ready repair, which protects the tire, and which affords to the wheel a superior gripping action upon the road.

In the accompanying drawing, which shows a tire-grip embodying the invention and composed of four sections, Figure 1 is a side-elevation of a vehicle-wheel showing the grip applied thereto. Fig. 2 is a vertical longitudinal section through the lower half of the wheel with some of the parts shown in elevation. Figs. 3 and 3ª are detail vertical transverse sections through the rim and tire, respectively on lines 3, 3, and 3ª, 3ª, Fig. 1. Fig. 4 is an elevation on a larger scale of one of the treads of the grip, and Fig. 5 is a bottom-view of the same.

Similar reference numerals indicate corresponding parts in all the figures.

In the form of embodiment shown in the accompanying drawings, the wheel rim 10 has secured thereto two solid elastic rubber ribs 11 and 12, disposed side by side and forming a circumferential groove 15 between them. A retaining band is disposed between said ribs in said groove between the base and top thereof. This band is preferably a sectional band and may be composed of semi-circular sections 13 and 14. These sections may be composed of wire cord of suitable size and strength and their ends may be passed through openings 20 in the rim 10 to the inner face thereof, and secured by clamps 21. A series of transverse metallic treads 30 disposed apart from one another and spanning the space between said elastic ribs rest at their outer ends on said ribs. These treads have outer road engaging faces 31 and central lugs or shanks 32 having perforations 33. These shanks project inward radially between said ribs and the treads are strung thereby on the band aforesaid.

The shape of the individual treads is more particularly shown in Figs. 4 and 5. The outer or wearing face of the same is preferably curved transversely of the tire so as to present a curved surface to the road and so as to lift the tire-members 11 and 12 from the road and cause the weight of the wheel to be supported equally between them. As seen in Fig. 2 the treads are also curved at their front and rear faces, thus forming where these faces meet the bottom of the tread front and rear curved edges 36, 37, thus rendering the tread broadest at its middle portion. At the inner face of the tread are tire-seats 38, 39, preferably made concave so as to permit the tire to rock to a small extent on the tread without injuring the tire. For this purpose also, and to prevent shearing of the cable, the opening 33 in the tread is chamfered at its edges, thus permitting the tire to rock without bringing about any sharp bending action of the tread upon the retaining cable. A series of intervening elastic spacing members 41 composed of soft rubber or other suitable material and preferably tubular in form are strung on said band between said treads, preferably in alternation therewith. These spacing members impart a circumferential elasticity and permit the treads 30 to move individually or in groups on said band under the resistance of said spacing members. The treads extend outward beyond the spacing members and have an elastic gripping action on the roadbed. The rigid shanks of the tread serve as regulating abutments between the elastic spacing members which are structurally independent thereof, and the circumferential elasticity is thereby somewhat under control. The spacers 41 are of such size and shape as to reliably seat themselves in the groove 15 and thereby reliably position the cable. They close the groove against sand, loose stones and other road material, and cover and protect those portions of the cable which would otherwise be exposed between the treads. They permit the rocking action between the tire and treads, restoring the treads to original radial position after such rocking, and they permit bodily movement of the treads lengthwise of the cable, toward either end, and restore the treads to original position after such movement. They provide a spacing means without shearing action on the cable. The treads are preferably arranged and spaced apart by the cushions at such small distances on the retaining cable that those portions of the wheel-tire between the treads do not normally contact with the road. Thus the tire is protected from wear. The cushions constitute an additional tire-member between the tire-members 11 and 12, which is adapted with them to contact with and resist such protuberances and obstructions in the road as may reach the tire between the treads.

In the operation of starting the vehicle, application of power to the wheel causes the wheel to turn within the tire-grip, the wheel-tire slipping in the seats 38, 39, of the tread or treads which are in engagement with the road, and causing the cushions and treads of that section of the tire-grip to become bunched so that the cushions are compressed between the treads. The pressure of the wheel communicated through the rim to the retaining-member rises and the corresponding resistance of the cushions rises until the reaction is sufficient to move the vehicle forward. The wheel then rolls over the tread, and in like manner over the succeeding treads. The treads passed over are restored to normal position on the retaining member by the cushions. Thus the vehicle is started gradually and without shock, and the injurious effects upon the vehicle mechanism, wheel-tires and vehicle-load, of sudden and violent application of power, are wholly avoided. Owing to the gradual application of the power and to the starting of the vehicle when the power necessary for that purpose has been accumulated, without application of excess force upon the treads, these members exert less force upon the roadway in starting than tread members rigidly or substantially rigidly mounted and turning with the wheel, and they thus enable the vehicle to more readily start in and traverse roads obstructed with mud, snow, slush or other yielding material. The tire-grip is assembled by stringing the treads and cushions alternately upon the retaining-member and then passing one end of the member through an opening of the rim, and securing the same by a clamp, and then passing the other end of the retaining-member through another hole in the rim, drawing the retaining-member tight, or to the desired degree of tautness with any suitable tool, or by hand, and clamping the same at said end. The same operation is performed with each section of the grip until the wheel circumference is covered, the wheel being rolled forward on the first section to expose the tire for applying the last section. Any desired form of clamps may be employed, the form preferred comprising a device having two openings, with set-screws at each opening. The cable-end is passed through one opening and secured by its screw.

In place of cushions of rubber, helical steel-springs may be employed. The treads may be of any suitable shape. The grip may be made in any desired number of sections and applied to a tire of any cross-section, the treads and cushions being correspondingly formed. The parts being separable from each other, the grip may be assembled without the use of tools, and in case of breakage of any section repairs may be made without jacking up the wheel and without affecting any other section of the grip.

The improved tire-grip is specially adapted for the wheels of heavy auto-trucks having solid tires, as it protects the same, gives a good hold on the ground and prevents skidding.

It is obvious that numerous changes may be made from the embodiment of the invention which has been described, without departing from the spirit of the invention as set forth in the following claim.

I claim:

The combination with a tire comprising two elastic ribs disposed circumferentially in parallel relation and forming a groove between them, of a tire grip comprising a band disposed in the groove between said ribs, a series of transverse metallic treads disposed apart from one another and spanning the space between said elastic ribs and resting on the peripheries thereof, said treads having central perforated shanks strung on said band between said ribs and a series of intervening elastic spacing members strung on said band between said treads, said elastic spacing members imparting a circumferential elasticity to said treads and closing the spaces in said groove between said treads and said treads projecting beyond said spacing members and having an elastic gripping action on the roadbed.

In testimony, that I claim the foregoing as my invention, I have signed my name in presence of two subscribing witnesses.

OTTO BAHLS.

Witnesses:
PAUL GOEPEL,
JOHN MURTAGH.

Copies of this patent may be obtained for five cents each, by addressing the "Commissioner of Patents, Washington, D. C."